April 21, 1964     W. H. JOHNSTON     3,130,304
DEEP WATER ISOTOPIC CURRENT ANALYZER Filed July 26, 1962     3 Sheets-Sheet 1

INVENTOR.
WILLIAM H. JOHNSTON
BY

INVENTOR.
WILLIAM H. JOHNSTON

United States Patent Office 3,130,304
Patented Apr. 21, 1964

3,130,304
DEEP WATER ISOTOPIC CURRENT ANALYZER
William H. Johnston, Baltimore, Md., assignor to the United States of America as represented by the United States Atomic Energy Commission
Filed July 26, 1962, Ser. No. 212,748
6 Claims. (Cl. 250—43.5)

The present invention relates generally to oceanography, and in particular, to novel method and apparatus for using radioactive isotopes for measurement of ocean currents at various levels beneath the surface of the water.

In oceanographic studies a need exists for an instrument capable of measuring the speed and direction of very slow ocean currents. These currents are slower than 10 cm. per sec., and are of interest especially between 0.1 and 10 cm. per sec. Mechanical devices for current measurement do not operate properly at such current speeds. Others, such as those which depend on the Doppler shift in sound either integrate over too small a volume or are too expensive for routine work.

It is the object of this invention to provide an economical and practical apparatus and method for the analysis of slowly moving, deep ocean currents by providing a mechanism for injecting a small amount of a short-lived radioactive isotope which drifts with the current to one of a group of detectors.

It is a further object to provide a means for injecting the radioactive isotope in such a way as to avoid introducing any vertical or horizontal component of force which might affect the flow of the isotope from the point of injection to the point of detection.

It is a further object to provide means for raising and lowering the point of injection of the radioactivity relative to the detectors, so that studies can be made of vertical as well as horizontal current movements.

A further object is to provide an instrument that will cause the least interference with the flow of the ocean current.

The foregoing objects are achieved by injecting a radioactive isotope into the water and measuring the time required for the isotope to reach one of a group of detectors arranged in a circular array around the point of injection. The elapsed time indicates the current velocity, while the location of the detector which detects the radioactive isotope indicates the direction in which the current is flowing.

The invention may be understood in greater detail by reference to the attached drawings, wherein.

Figure 1:
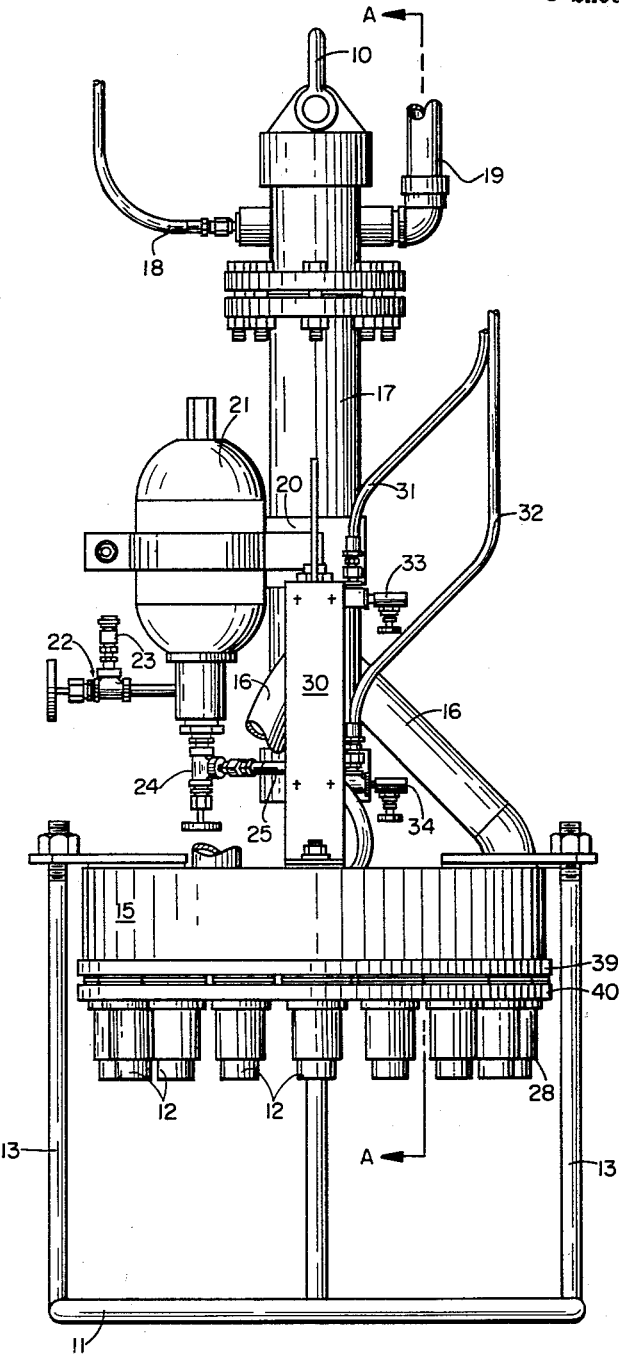
FIG. 1 is a side elevation of the current analyzer, portions being broken away for clarity.
Figure 2:
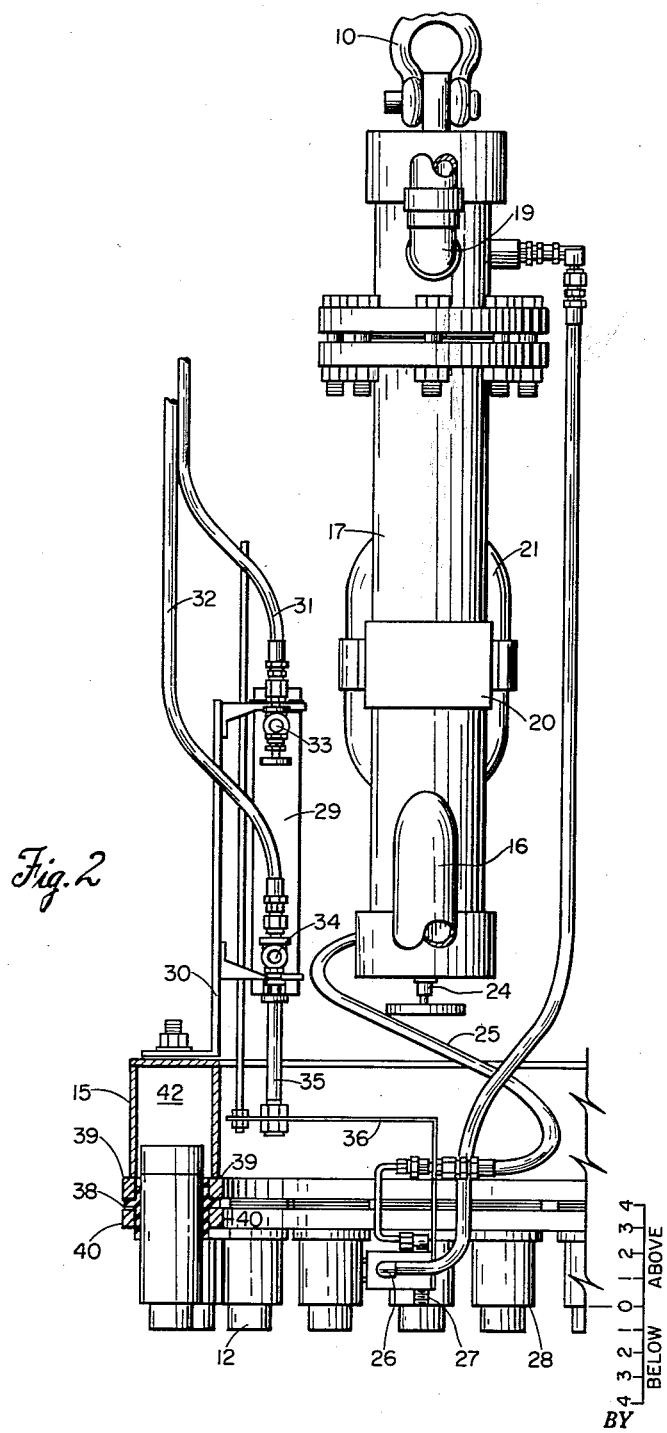
FIG. 2 is a cross-sectional view taken along line A—A of FIG. 1.
Figure 3:
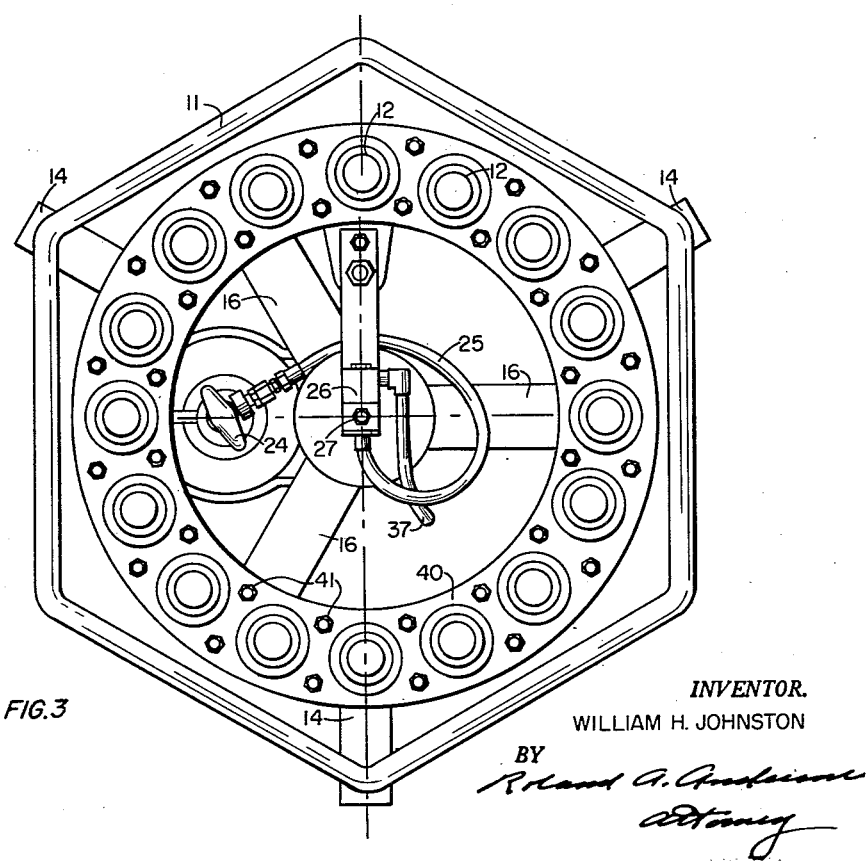
FIG. 3 is a bottom view of the analyzer of FIG. 1, showing the circular array of detectors around the point of injection of the radioactive material.

With reference to FIGS. 1, 2 and 3, the device consists of an underwater unit suspended from a shackle 10 at the upper end and having a hexagonal supporting stand 11 adapted to rest on the ocean floor so as to support a plurality of scintillation counters 12 a short distance off the bottom. Three vertical members 13 are bolted to flanges 14 attached at 120° intervals to the top surface of a circular housing 15 which supports around its periphery, the scintillation counters 12.

Three supporting tubes 16 are attached at their lower ends to the housing 15 at 120° intervals, and at their upper ends to the tubular vertical stem 17 of the instrument. The stem 17, supporting tubes 16 and circular housing 15 are hollow and their interiors are in communication, so that air pressure intorduced into the stem 17 through the air hose 18 provides the necessary air pressure for counteracting water pressure on the scintillation counter housings and to prevent inleakage of water which would damage the electronic components of the device.

Also attached to the main stem 17 of the instrument is a flexible conduit 19 leading to the electronic controls and recording system on the surface.

Attached to the stem 17 is a bracket 20 which supports a pressurized accumulator tank 21 containing a radioactive tracer solution. The interior of tank 21 is divided by a flexible membrane, e.g., a rubber diaphragm (not shown) into two compartments. The upper compartment of the tank as in FIG. 1 contains compressed air, whereas the lower compartment contains the radioactive solution. A valve 22 and line 23 are used for introducing the solution into the tank 21. Once the lower compartment of tank 21 has been filled, valve 22 is kept closed.

Because of the force exerted by the air pressure through the membrane in tank 21, the radioactive solution would receive a strong downward component of velocity on being injected into the ocean current. In order to avoid this problem a needle valve 24 is placed in the radioactive source injection line 25 between the accumulator tank 21 and the solenoid operated source ejector valve 26 (FIGS. 2, 3).

The source ejector valve 26 is so arranged that its outlet 27 is at the exact center line of the instrument and equidistant from each of sixteen scintillation counters 12. In normal operation, and as shown in FIG. 2, the valve outlet is located in the plane defined by the lower surface of the sixteen photomultiplier assemblies 28.

Means are provided for raising and lowering the ejector valve outlet by an amount equal to 4-inches above and below the position shown in FIG. 2. This is accomplished by a hydraulic master-slave cylinder arrangement. The slave cylinder 29 is supported by means of a bracket 30 bolted to the top of the circular housing 15. Oil lines 31, 32 and valves 33, 34 associated therewith, connect the slave cylinder with a master cylinder (not shown) located on the surface. Both master and slave cylinders have an 8" stroke, required to move the ejector valve outlet ±4-inches in the vertical direction.

The piston 35 of the slave cylinder is secured to a bracket plate 36, which in turn is fastened to the source ejector valve 26, so that movement of the piston will move the source ejector valve vertically along the center line of the instrument. Power leads 37 for actuating the solenoid valve, connect the valve with a source of power on the surface.

The lower plate 39 of the circular housing 15 is provided with 16 circular openings to receive the 16 cylindrical NaI—(Tl) crystal-photomultiplier tube assemblies. As shown in FIG. 2, a flanged gasket 38 is placed around each assembly, which is then inserted in one of the circular openings until the upper surface of the gasket is in contact with the lower surface of plate 39 of the housing. When all of the assemblies are in place, an annular plate 40, having 16 openings corresponding to the openings in the plate 39, is bolted by means of bolts 41 (FIG. 3) to plate 39, effectively sealing the assemblies in position. The zone 42 above the sealed assemblies contains pressurized air as previously described.

While dimensions are by no means critical, an actual embodiment of the instrument is 5′5″ from the shackle 10 to the supporting plate 11; and the centers of the detectors lie on a circle 20″ in diameter.

Operation

When the instrument is in position and oriented, radioactivity is injected into the ocean current. The time required for the radioactivity to reach one of the 16 scintillation counters determines the speed of the current, while the location of the counter receiving the signal indicates the direction of the current.

Electronic circuitry for determining the foregoing data is located partly within the instrument itself and partly in an interpretation unit on the surface.

At the base of each of the scintillation counters in the instrument is a circuit that amplifies the signal and matches impedance with the cable extending from the instrument to the surface. The unit that interprets the signals from the counters is a transistorized diode computer logic circuit which indicates both the elapsed time between radioactivity injection and detection, and the direction by showing which of the 16 counters is experiencing the highest counting rate. Using a dual pen recorder, the data on elapsed time and direction are recorded. By use of a programmer, the instrument may be automatically operated at preset intervals of 30 seconds to 120 minutes.

Figure 4:
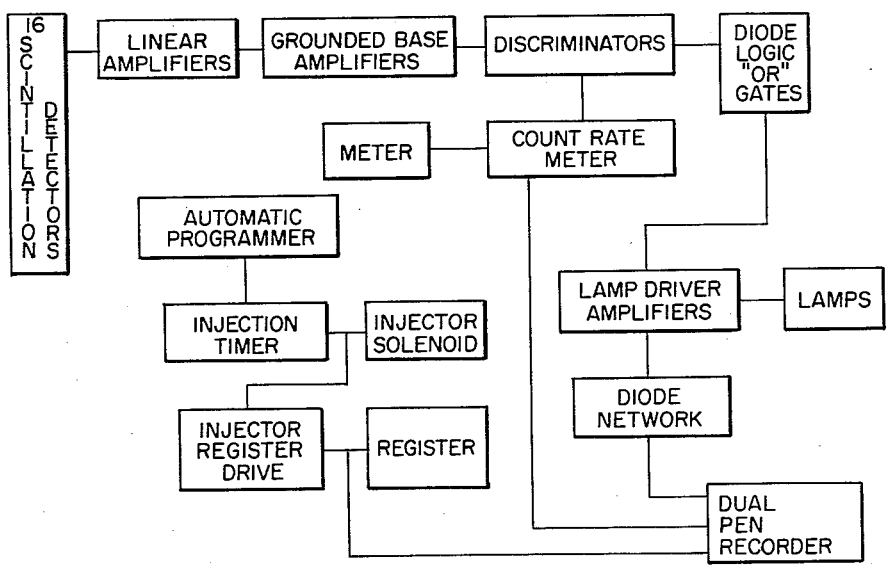
FIG. 4 is a block diagram of the electronic components of the device.

The programmer (FIG. 4) begins the cycle by actuating the injector solenoid to inject radioactive material into the ocean current. The amount of material injected depends upon the setting of the injector timer and can be varied by adjusting the time constant of a flip-flop circuit. Simultaneously with injection, a register is actuated to record the total number of injections, and a pulse is sent to a dual pen recorder to indicate on a moving chart the instant of injection.

The radioactive material is carried by the ocean current to the vicinity of one of the 16 scintillation counters. Here the presence of the radioactivity is detected, the signal is amplified by a linear amplifier and a grounded base amplifier, after which the signal is fed in a discriminator. The number of counts per second received by the detector is then indicated both on a count rate meter and on one of the pens of the dual pen recorder. Simultaneously, the detector circuit is identified and a lamp representing the particular underwater scintillation counter is illuminated. A signal is passed through to the dual pen recorder which indicates on a chart which counter has received the signal.

The direction of the current is shown by the identification of the counter receiving the signal. The velocity of the current is readily obtained by noting the time of injection and the time of detection of the signal, since the distance from the point of injection to the counters is known.

Should the instrument be located where the water is not moving horizontally, the radioactivity will be carried up or down and hence away from the detectors. Under these conditions a much smaller than usual response will be obtained, or, under extreme cases, no response would be obtained. This problem is solved by raising or lowering the point of injection with respect to the counters until the count rate is maximized. Under such conditions, the instrument will give the velocity and horizontal direction of the current and also indicate the amount of vertical movement relative to horizontal movement.

Under typical operating conditions, the accumulator, reducing valve and solenoid valve are adjusted to deliver one milliliter of solution in 40 milliseconds. The radioactive component of the solution may be iodine-131, although other radioactive isotopes such as dysprosium-165 may be substituted. For relatively shallow water, 0.1 to 0.5 microcurie of iodine-131 have been successfully employed. However, in deep water, where background activity is reduced, somewhat lower concentrations may be used to advantage.

While the subject instrument employs sodium iodide scintillation counters, any detectors, for example, geiger counters, may be substituted provided such detectors are suitable for detecting the type of radioactive material which is injected into the water.

The arrangement of the scintillation counters, the injection means, and the supporting housings are all designed to reduce to a minimum any interference with the normal flow of the current being analyzed.

The present instrument is not only rugged and reliable in construction and operation but also it has demonstrated its capacity for detecting and analyzing very slow water currents.

What is claimed is:
 1. Apparatus for determining direction and velocity of liquid currents that comprises:
  (a) A liquid-tight housing;
  (b) Means for immersing the housing in a body of liquid;
  (c) A plurality of radiation detectors arranged in a circular array in the housing;
  (d) An injector for radioactive material spaced centrally of the array and equidistant from each of the detectors therein;
  (e) Control means for the injector for injecting radioactive material into said body of liquid;
  (f) Means for determining the time required for radioactive material injected by said injector to reach one of the detectors, and
  (g) Means for identifying the detector which detects the radioactive material.
 2. Apparatus as set forth in claim 1 including hydraulically operated means for moving the injector vertically with respect to the circular array while maintaining the injector equidistant from each of said detectors.
 3. Apparatus as set forth in claim 1 wherein the control means for the injector consists of a source of liquid radioactive material, means for pressurizing said material, conduit means connecting the source of radioactive material with the injector, a needle valve in said line, and a solenoid operating the injector for releasing the radioactive material.
 4. Apparatus for determining the direction and velocity of water currents that comprises:
  (a) A tubular stem, tubular supporting arms and a hollow circular housing, said stem, arms and housing being in internal communication;
  (b) Means for introducing air under pressure into said stem to pressurize the stem, arms and housing;
  (c) A plurality of radiation detectors arranged in a circular array in said housing;
  (d) A solenoid actuated injector valve located centrally of the circular array of detectors for releasing radioactive material;
  (e) A source of a liquid radioactive material for said injector valve;
  (f) Means for determining the time required for radioactive material released by said injector valve to reach one of the detectors in said circular array, and
  (g) Means for identifying the detector which detects the radioactive material.
 5. Apparatus as set forth in claim 4 wherein the source of radioactive material consists of a tank mounted on the stem, pressurized radioactive material in a portion of said tank, a conduit connecting the tank and the injector valve, and a needle valve in said conduit intermediate the tank and injector valve.

6. Apparatus as set forth in claim 5 including an hydraulically operated cylinder mounted on the circular housing, a piston operated by said cylinder and secured to one end of a bracket, the other end of said bracket supporting the injector valve, whereby movement of said piston displaces the injector valve vertically while maintaining the valve equidistant from the detectors in the circular array.

References Cited in the file of this patent
UNITED STATES PATENTS

| | | |
|---|---|---|
| 2,617,941 | Craggs | Nov. 11, 1952 |
| 2,913,900 | Andrews | Nov. 24, 1959 |

OTHER REFERENCES

Nuclear Science and Oceanography, by Revelle et al., from Peaceful Uses of Atomic Energy, volume 13, pages 371–380, United Nations Publication, New York, N.Y., 1956.